G. K. WENIG.
HARNESS.
APPLICATION FILED JUNE 3, 1907.

906,973.

Patented Dec. 15, 1908.

Witnesses:

Inventor:
George K. Wenig,
by
Joshua R. H. Potts
Atty

UNITED STATES PATENT OFFICE.

GEORGE K. WENIG, OF CHICAGO, ILLINOIS.

HARNESS.

No. 906,973.　　　Specification of Letters Patent.　　　Patented Dec. 15, 1908.

Application filed June 3, 1907. Serial No. 377,120.

*To all whom it may concern:*

Be it known that I, GEORGE K. WENIG, a citizen of the United States, residing at 241 West Sixteenth street, in the city of Chicago, county of Cook, and State of Illinois, have invented certain new and useful Improvements in Harness, of which the following is a specification.

My invention relates to harness and has particular reference to the connection between the trace and the whiffle-tree.

More particularly my invention has reference to improvements in that portion of said connection known as the "D".

The object of my invention is to provide a harness which shall have a yielding connection between the trace and whiffle tree.

A further object is to provide a yielding connection between the trace and whiffle tree which shall be strong and durable, and which may be readily used to replace the ordinary D without necessitating any alteration in the rest of the harness or the draft gear of the wagon.

Further objects will appear hereinafter.

With these objects in view my invention consists in the harness hereinafter described and particularly set forth in the claims.

Figure 1:
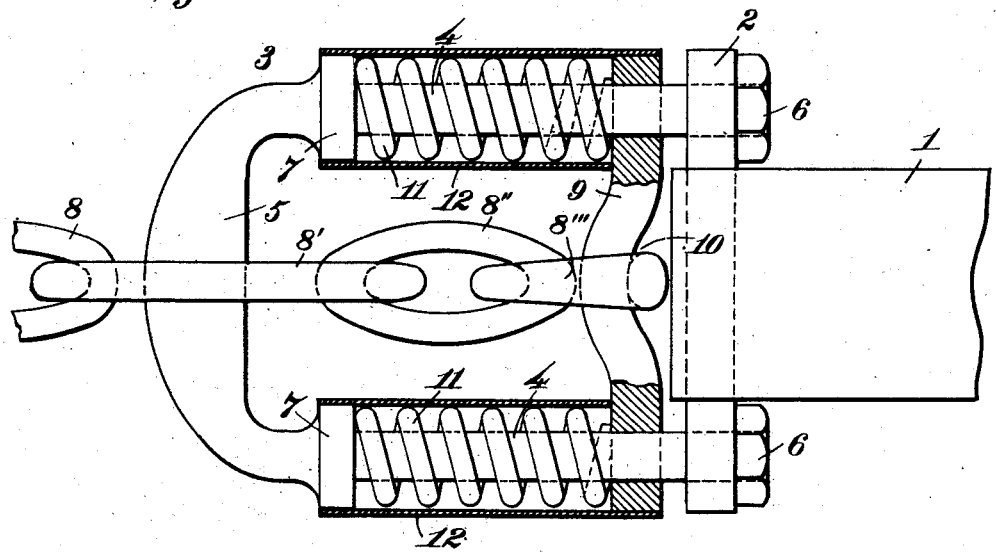
Figure 2:
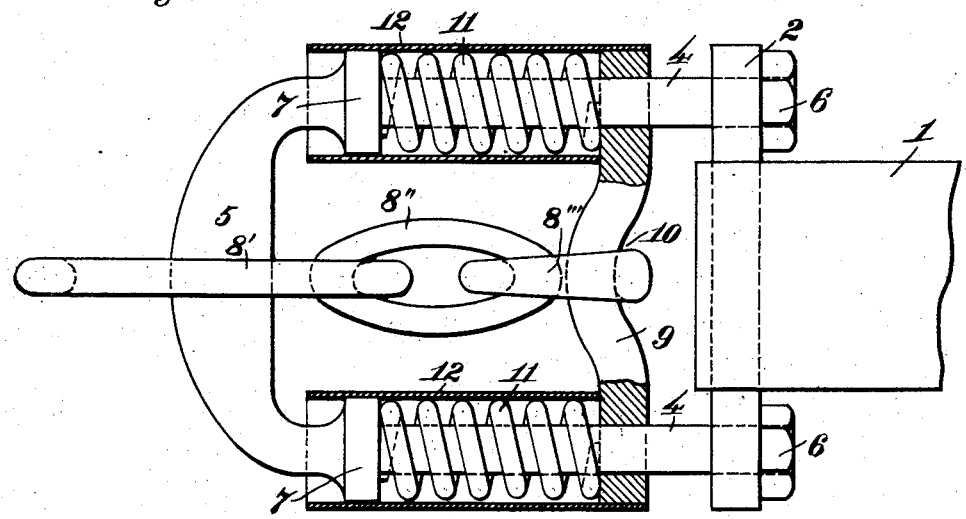

My invention will be more readily understood by reference to the accompanying drawings forming a part of this specification and in which, Figure 1 is a sectional view of the portion of the harness embodying my invention, and Fig. 2 is a similar view partially in section, illustrating the springs slightly compressed.

Referring to the drawings, 1 indicates the trace connected to the yoke, 2 of the D in the ordinary manner, 3 indicates the D proper which comprises the stems, 4—4 connected by the portion, 5. The stems, 4, are connected at their free ends to the yoke, 2, by nuts, 6, and are provided near their opposite ends with shoulders 7.

8, 8', 8'', 8''' indicate the links by which the D is attached to the end of a whiffle tree. Instead of being connected to the part, 5 of the D, they are connected to a bar, 9, slidably arranged upon the stems, 4. The bar, 9, is bent as shown forming a notch, or recess, 10 for the link, 8''', keeping the same centered, to equalize the pull on the bar; and to permit the bar to approach nearer to the yoke, 2 forming a compact device. Between the ends of the bar, 9, and the shoulders, 7, are interposed springs, 11. These are the ordinary coil springs and are arranged about the stems, 4. It is obvious that any strain or shock exerted upon the chain or links will be communicated to the trace through the springs, 11, only, thus avoiding any sudden shocks to the horse. I surround the springs, 11, with a tubular casing, 12. This is connected to the bar, 9 in any suitable manner and moves therewith, sufficient distance being provided between the shoulders, 7 and the portion, 5, to permit enough movement thereof. It will be seen, by reference to the drawings, that the springs are securely incased, hence are protected from grit and dirt. These casings, 12 also prevent anything being caught between the coils of thes prings.

The yielding connecting device, shown and described, is strong and durable, and is of such size that it may readily replace the ordinary D without changing any portion of the harness or wagon.

Having described my invention, what I claim as new and desire to secure by Letters Patent is, 1. In a harness, a yoke adapted to be secured to the trace, a D-shaped member secured to said yoke, a bar slidably arranged upon said D-shaped member and having a centrally disposed notch, springs resisting the movement of said bar and links for connecting said bar to a whiffletree, one of said links engaging said notch, substantially as described.

2. In a harness a yoke adapted to be secured to the end of a trace and having its ends extending beyond the edges thereof, a D shaped member comprising a pair of parallel stems secured to the ends of said yoke and connected at the opposite ends by an integral D shaped member, a bar slidably mounted on said stems at the opposite end from said D shaped portion, collars on said D shaped member at the base of the stem portions, springs interposed between said sliding bar and said collars, spring casings fixed to the ends of said sliding bar and surrounding said springs and said collars, there being sufficient distance between said collars and said D shaped portion to permit ample movement of the casings and a plurality of links for connecting said bar to a whiffle-tree, said bar being notched to hold said links centrally, substantially as described.

In testimony whereof I have signed my name to this specification in the presence of two subscribing witnesses.

GEORGE K. WENIG.

Witnesses:
F. E. SHEEHY,
H. S. AUSTIN.